(12) United States Patent
Wu et al.

(10) Patent No.: US 7,937,110 B2
(45) Date of Patent: May 3, 2011

(54) DISTRIBUTED BASE STATION SYSTEM AND METHOD FOR NETWORKING THEREOF AND BASE BAND UNIT

(75) Inventors: Wangjun Wu, Guangdong (CN); Chengdong Yu, Guangdong (CN); Zhu Tan, Guangdong (CN); Tao Pu, Guangdong (CN); Wensheng He, Guangdong (CN); Peng Lan, Guangdong (CN); Jun Zhou, Guangdong (CN); Ming Yu, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1103 days.

(21) Appl. No.: 10/589,323

(22) PCT Filed: Jan. 12, 2006

(86) PCT No.: PCT/CN2006/000044
§ 371 (c)(1),
(2), (4) Date: Feb. 9, 2007

(87) PCT Pub. No.: WO2006/074607
PCT Pub. Date: Jul. 20, 2006

(65) Prior Publication Data
US 2007/0177552 A1   Aug. 2, 2007

(30) Foreign Application Priority Data

Jan. 12, 2005  (CN) .......................... 2005 1 0001936
May 19, 2005  (CN) .......................... 2005 1 0070835

(51) Int. Cl.
*H04M 1/00*   (2006.01)

(52) U.S. Cl. .................. 455/561; 455/550.1; 455/554.1; 455/554.2; 455/555; 455/562.1

(58) Field of Classification Search ....... 455/554.1–555, 455/561–562.1, 550.1
See application file for complete search history.

(56) References Cited

U.S. PATENT DOCUMENTS

| 6,058,317 | A   | * | 5/2000  | Posti ............................. 455/561 |
| 6,647,276 | B1  | * | 11/2003 | Kuwahara et al. .......... 455/562.1 |
| 7,200,391 | B2  | * | 4/2007  | Chung et al. ................. 455/423 |
| 7,483,445 | B2  | * | 1/2009  | Yagawa ........................ 370/463 |
| 7,684,435 | B2  | * | 3/2010  | Kim et al. ..................... 370/466 |

(Continued)

FOREIGN PATENT DOCUMENTS

CA  2007-500205 A1   9/2005

(Continued)

OTHER PUBLICATIONS

English Translation of International Preliminary Report.

(Continued)

*Primary Examiner* — Kamran Afshar
*Assistant Examiner* — Babar Sarwar

(57) ABSTRACT

The present invention discloses a distributed base station system as well as its networking method and base band unit. In this system, the base band unit (BBU) and RF unit (RFU) of the base station are separated, and the RFU is equipped with base band RF interfaces for interconnecting the BBU and transmitting data information, thereby forming the base station. Based on the separation of the BBU from the RFU, the BBU capacity is further divided at the same time, and every unit is also arranged independently. The BBU networking and capacity expansion may be achieved with capacity expansion interfaces and base band RF interfaces provided by BBU interface units in flexible and convenient ways.

18 Claims, 9 Drawing Sheets

U.S. PATENT DOCUMENTS

| | | | |
|---|---|---|---|
| 2002/0141512 A1 | 10/2002 | Blanke | |
| 2004/0004943 A1 | 1/2004 | Kim et al. | |
| 2004/0087275 A1* | 5/2004 | Sugar et al. | 455/61 |
| 2005/0113024 A1* | 5/2005 | Capece et al. | 455/41.2 |
| 2005/0255890 A1* | 11/2005 | Nakada | 455/561 |
| 2006/0013146 A1* | 1/2006 | Cheung et al. | 370/252 |
| 2006/0013167 A1* | 1/2006 | Wheatley et al. | 370/335 |
| 2009/0149221 A1* | 6/2009 | Liu et al. | 455/561 |
| 2009/0221319 A1* | 9/2009 | Lan et al. | 455/550.1 |
| 2010/0016021 A1* | 1/2010 | Xu et al. | 455/560 |

FOREIGN PATENT DOCUMENTS

| | | |
|---|---|---|
| CN | 1284824 A | 2/2001 |
| CN | 1555141 A | 12/2004 |
| CN | 100426897 C | 10/2008 |
| GB | 2347319 | 8/2000 |
| JP | 2002-319920 A | 10/2002 |
| JP | 10243446 | 1/2004 |
| JP | 2004-40802 | 2/2004 |
| JP | 2007-523577 A | 8/2007 |
| WO | WO96/27269 | 9/1996 |
| WO | WO/2004047472 | 6/2004 |

OTHER PUBLICATIONS

First Chinese Office Action for Chinese Appln. No. 200510070835.5.
First Chinese Office Action for Chinese Appln. No. 200710167729.8.
First Chinese Office Action for Chinese Appln. No. 200810074381.2 (English translation same as Chinese Appln. No. 200510070835.5).
Second European Office Action.
First Japanese Office Action.
Second Japanese Office Action Appln. No. 2007-503179.
First Indonesia Office Action.
First Russian Office Action.

* cited by examiner

Support3 ×1

DISTRIBUTED BASE STATION SYSTEM AND METHOD FOR NETWORKING THEREOF AND BASE BAND UNIT

FIELD OF THE TECHNOLOGY

The present invention relates to the base station technology, and more specifically to a distributed base station system and a method for networking thereof and base band units forming the distributed base station.

BACKGROUND OF THE INVENTION

In mobile communication systems, base stations are important components used for connecting User terminals to Base Station Controllers (BSC), receiving and transmitting radio signals between the User terminals and the BSCs, thereby conducting User terminals to access wireless networks and simultaneously accomplishing information intercommunications between User terminals and the BSCs. As shown in FIG. 1, a base station includes:

a Base Station &BSC interface unit, also called transmission unit, used for accomplishing interface functions between the base station and the BSC; a Main Processing & Timing unit, on the one hand, for controlling the base station and exchanging cell and traffic data among the units in the base station, on the other hand, for providing clock signals for other units in the base station; an uplink/downlink base band signal processing unit, used for processing symbol-level and chip-level digital signals in physical layer and communicating digital base band signals with an Intermediate Frequency (IF) signal processing unit; the IF signal processing unit, used for converting digital base band signals to IF signals or converting IF signals to digital base band signals; a power amplifier unit and a duplexer, used for amplifying the IF signals from the IF signal processing unit or an antenna.

In the base station, the Base Station &BSC interface unit, the Main Processing & Timing unit, and the uplink/downlink base band signal processing unit compose a base band part, while the IF signal processing unit, the power amplifier unit and the duplexer compose a Radio Frequency (RF) part which accomplishes conversion between digital base band signals and IF signals, and transmits the processed RF signals. The components in FIG. 1 are all placed in one cabinet to form a complete Base Station.

In traditional base station systems, macro base stations and mini base stations are generally used. A macro base station generally has large capacity so as to support the configuration of as many as 3 or 6 sectors, and includes an indoor type and an outdoor type; while a mini base station usually has small capacity so as to only support the configuration of 1 to 3 sectors. The Mini base station is generally required to have support capability of outdoor application, and acts as a strong complement for the macro base station networking.

The macro base station supports large capacity, and all its single boards and modules are all placed in one cabinet, and thus the macro base station has a large size and a heavy weight, therefore, it needs a special installation room or an outdoor installation base. While the mini base station supports small capacity, the size thereof is comparatively small and it supports pole installation or wall installation, so that the installation is easy and does not need special installation space or floorage. The construction of the macro base station and the mini base station generally used are introduced hereinafter respectively:

(1) In the macro base station, the transmission unit, the Main Processing & Timing unit and the uplink/downlink base band signal processing unit forming the base band part are respectively placed on different functional single boards, which are connected with one another by a backboard. Different single boards or modules may be added according to different capacity expansion requirements; the duplexer, the power amplifier unit, the IF signal processing unit that form the RF part are also placed on different functional single boards, which are connected with each other by a backboard or external wirings. All the above units are configured in one indoor or outdoor cabinet. An outdoor cabinet additionally includes such functional units as temperature control equipment, power supply, environment monitoring equipment and transmission equipment. With all the components in large sizes, the cabinet is very large and heavy, resulting in high cost of transportation and installation and a hard installation site selection, thereby, the network construction speed is badly affected. This kind of structure takes up a large space and leads to a high power consumption and cost. When backup is required, it needs to add some single boards or modules to achieve backup, thereby resulting in high backup cost and complicating backup action.

(2) In the mini base station, all the units in FIG. 1 are placed in a compact structural member module, thereby a mini base station having a small size and an easy installation. A mini base station generally supports configuration of 1-3 sectors. In the situation that one single cabinet supports one sector, a plurality of mini base stations are necessary for networking when more sectors should be supported or large capacity configuration is needed, thereby complicating networking and management of the system.

The mini base station has the shortcomings of small capacity, inconvenient capacity expansion and inflexible networking, although the mini base station has such advantages as small size and easy installation. A plurality of cabinets of mini base stations should be combined when capacity expansion is required, and this is not in favor of wiring, protection and backup. Therefore, mini base stations are not fit for the expected applications of large capacity, furthermore, are not in favor of expanding capacity of the base band part or the RF part respectively due to the base band part and the RF part adopting integration design.

SUMMARY

A distributed base station system has advantages of reducing space occupancy, deducing operational cost and improving operational reliability of base station system according to the embodiments of the invention.

A distributed base station system includes:

a base band unit (BBU), which includes a Main Processing & Timing unit, a base band signal processing unit, a transmission unit, and an interface unit for providing an interface for intercommunicating data with an external unit, intercommunicating digital base band signals with the base band signal processing unit, and intercommunicating master control information with the Main Processing & Timing unit; wherein the interface unit includes one or a plurality of primary base band Radio Frequency (RF) interface(s); and the interface unit being integrated with the Main Processing & Timing unit, the base band signal processing unit and the transmission unit; and a Radio Frequency unit (RFU) which includes a secondary base band RF interface thereon;

wherein the primary base band RF interface of the BBU is connected with the secondary base band RF interface of the RFU, and the BBU transmits uplink/downlink base band data and master controller state information with the RFU via the primary base band RF interface and the secondary base band RF interface.

Preferably, the primary base band RF interface and the secondary base band RF interface both are high speed digital interfaces.

Preferably, the base station system includes a plurality of BBUs, and the BBUs are interconnected with each other via wire cables or optical fibers; the interface unit of each BBU includes one or a plurality of primary capacity expansion interface(s) for transmitting synchronous clock signals, base band information, transmission information and the master control information among BBUs, to achieve interconnection and data sharing among BBUs.

Preferably, the primary capacity expansion interface includes a primary capacity expansion interface that provides an active/standby switchover control signal. The interface unit further includes an identification interface for marking the type of the base station and the position of the BBU. The interface unit may further includes a Dry Contact input interface for expanding the input Dry Contact functions of the base station. The BBUs include a master BBU that works in an active state. The BBUs may also include a standby BBU that works in a standby state. The RFU may be connected with any one of the plurality of BBUs.

Preferably, the BBUs include a slave BBU that works in a slave state.

Preferably, the system further includes an exchange BB cassette with a plurality of secondary capacity expansion interfaces, and each BBU is connected with one of the secondary capacity expansion interfaces on the exchange BB cassette via the respective primary capacity expansion interface of the BBU.

Preferably, the RFU is a radio remote unit (RRU).

Preferably, the RRU and the BBU are connected with each other via transmission mediums.

Preferably, the RFU is a near-end RFU.

Preferably, the BBU is placed in a spare space of a standard cabinet with a height higher than or equal to 1 U.

A method for networking a distributed base station system includes:

separating the base station system into a BBU and an RFU in dispersed arrangement, wherein the BBU includes an integration of a base band signal processing unit, a transmission unit, a Main Processing & Timing unit and a interface unit; the interface unit of the BBU includes a primary base band RF interface, and the RFU includes at least one secondary base band RF interface; and connecting the BBU and the RFU through the primary base band RF interface of the BBU and the secondary base band RF interface of the RFU.

Preferably, the base station system includes a plurality of BBUs, and the interface unit of each BBU includes a primary capacity expansion interface, and then, the method further includes: setting an operation state of the BBU; and connecting the BBUs with each other via the primary capacity expansion interface on the interface unit thereof.

Preferably, the base station system includes a plurality of RFUs, each RFU includes a plurality of base band RF interfaces; and then the method further includes: connecting a plurality of RFUs with each other via their respective secondary base band RF interfaces.

Preferably, the base station system includes two BBUs and the step of setting the operation state of the BBU includes: setting one of the BBUs as a master BBU that works in an active state while setting the other BBU as a standby BBU that works in a standby state; and the step of connecting the BBUs to each other via the primary capacity expansion interface includes: connecting the master BBU to the standby BBU via the primary capacity expansion interface that provides an active/standby switchover control signal.

Preferably, the step of setting the operation state of BBUs includes: setting any one of the plurality of BBUs as a master BBU that works in the active state, and setting the others as slave BBUs that work in slave states; and the step of connecting the BBUs to each other via the primary capacity expansion interface includes: connecting the master BBU and slave BBUs via one or a plurality of primary capacity expansion interface(s) providing no active/standby switchover control signal.

Preferably, the step of setting the operation state of the BBU includes: setting any one of the plurality of BBUs as a master BBU that works in an active state, and setting the others as slave BBUs that work in slave states; and the step of connecting BBUs with each other via the capacity expansion interfaces includes: connecting the master BBU with the slave BBUs via one or a plurality of primary capacity expansion interface(s) providing the active/standby switchover control signal; and the Main Processing & Timing unit of the master BBU shielding the active/standby switchover control signal.

Preferably, the step of connecting BBUs with each other via the capacity expansion interfaces includes: connecting the master BBU with each of the slave BBUs via one or a plurality of primary capacity expansion interface(s) providing active/standby switchover control signals; and the Main Processing & Timing unit of the master BBU shielding the active/standby switchover control signal.

Preferably, the step of setting the operation state of BBU includes: setting anyone of the a plurality of BBUs as a master BBU that works in an active state, setting another one of the plurality of BBUs as a standby BBU that works in standby state, and setting the others as slave BBUs working in slave states, the master BBU and the standby BBU being not the same one; and wherein the step of connecting BBUs with each other via the primary capacity expansion interfaces includes: connecting the master BBU with the standby BBU via the primary capacity expansion interface that provides the active/standby switchover control signal, and connecting the standby BBU with the slave BBU via one or a plurality of primary capacity expansion interface(s) providing no active/standby switchover control signals.

Preferably, the step of setting the operation state of BBUs includes: setting any one of the plurality of BBUs as a master BBU that works in an active state, setting another one of the plurality of BBUs as a standby BBU that works in a standby state, and setting the others as slave BBUs that work in slave states, the master BBU and the standby BBU being not the same one; and wherein the step of connecting BBUs to each other via the primary capacity expansion interfaces includes: connecting the master BBU with the standby BBU via the primary capacity expansion interface that provides the active/standby switchover control signal, and connecting the standby BBU with the slave BBU via one or a plurality of primary capacity expansion interface(s) providing the active/standby switchover control signal, and the Main Processing & Timing unit in the standby BBU shielding the active/standby switchover control signal.

Preferably, the step of connecting BBUs to each other via capacity expansion interfaces includes: connecting the standby BBU with each slave BBU via one or a plurality of primary capacity expansion interface(s) providing the active/standby switchover control signal with the Main Processing & Timing unit in the standby BBU shielding the active/standby switchover control signal.

Preferably, the base station includes a plurality of slave BBUs, and the plurality of slave BBUs are interconnected with each other via the primary capacity expansion interfaces, the method further including any one step of the following steps: interconnecting slave BBUs to each other via primary capacity expansion interfaces that provide no active/standby switchover control signal; and interconnecting slave BBUs to each other via primary capacity expansion interfaces that provide the active/standby switchover control signal, meanwhile shielding the active/standby switchover control signal by the Main Processing & Timing unit of at least one of the two interconnected slave BBUs.

Preferably, the method further includes: configuring an exchange BB cassette with a plurality of secondary capacity expansion interfaces among the BBUs; and connecting the plurality of BBUs with the secondary capacity expansion interfaces of the exchange BB cassette via the respective primary capacity expansion interfaces of BBUs to achieve interconnection among the BBUs. Preferably, the method further includes: the exchange BB cassette setting up an electrical connection of the active/standby switchover control signal between the master BBU and the standby BBU according to the operation state of every BBU.

Preferably, the RFU is a radio remote unit (RRU), and the method includes: connecting the BBU and the RRU via a transmission mediums.

Preferably, the transmission mediums are optical fibers or electrical cables.

Preferably, the RFU is a near-end RFU.

Preferably, the BBUs are connected with each other via transmission mediums. The transmission mediums are optical fibers or electrical cables.

A base band unit (BBU) includes:

a Main Processing & Timing unit, for controlling a base station, exchanging signals and traffic data among the units in the base station and providing clock signals;

a base band signal processing unit, for processing symbol-level and chip-level digital signals in physical layer;

a transmission unit, which is connected with a base station controller for intercommunicating data information between the base station and the base station controller; and an interface unit for intercommunicating with external data information, intercommunicating digital base band signals with the base band signal processing unit, and intercommunicating master control information with the Main Processing & Timing unit;

wherein the interface unit including one or a plurality of primary base band RF interface(s) for connecting with the RFU and transmitting uplink/downlink base band data and master controller state information with the RFU; a power supply interface for connecting with an external power supply; and a debugging interface for managing and maintaining the base station; and the Main Processing & Timing unit, the base band signal processing unit, the transmission unit and the interface unit are integrated.

Preferably, the primary base band RF interface is a high speed digital interface. The debugging interface is a serial port and/or a network port. The interface unit further includes an identification interface for marking the type of the base station and the position of the BBU, and the identification interface is a DIP switch and/or a cable identification interface. The reset interface is a button or a switch. The power supply interface further includes a warning bus interface for connecting with equipment with RS485 port. The interface unit may further includes: a capacity expansion interface for transmitting clock synchronous signals, base band information, transmission information and master control information among BBUs to achieve interconnection and data sharing among BBUs.

Preferably, the interface unit further includes at least one of: a reset interface for resetting the base station; an identification interface for marking the type of the base station and the position of the BBU; a power supply switches for controlling power on and power off for itself; a test interface for connecting with external test equipments; a signal input interface for receiving external clock signals; a Dry Contact input interface for expanding input Dry Contact functions of the base station; an electrostatic discharge (ESD) connector; and a protect ground (PGND) terminal.

Preferably, the capacity expansion interface includes one or a plurality of capacity expansion interface(s) providing the active/standby switchover control signal.

Preferably, the signal input interface includes at least one of a signal input interface for receiving GPS synchronous clock signals and a signal input interface for receiving 2M synchronous clock signals.

Preferably, the test interface includes at least one of a 10M test interface for outputting 10M test synchronous clock signals and a transmission time interval (TTI) test interface for outputting TTI signals.

Preferably, the BBU is placed in a spare space of a standard cabinet with a height higher than or equal to 1 U.

Preferably, the Main Processing & Timing unit, the base band signal processing unit, the transmission unit and the interface unit are integrated on a single board.

In view of the above technical solutions, in the distributed base station system in accordance with embodiments of the present invention, the base band part is separated from the RF part. The base band unit (BBU) consisting of the base band part and the RF unit (RFU) consisting of the RF part are connected to each other via base band RF interfaces. Base band units are connected to each other via capacity expansion interfaces to achieve capacity expansion in many flexible ways. In this manner, the distributed base station system should take up smaller floorage, lower the operational cost and simultaneously enhance the operational reliability of the base station system.

On the basis of separated arrangement of the base band unit and the RF unit, the base band unit in accordance with embodiments of the present invention is further divided to several called base band capacity units which have basic capacity according to the capacity. The basic base band capacity unit may be separated to each other so that each of the basic base band capacity unit can support the minimum configuration of base station capacity respectively, and the BBU can support macro base station capacity while combining a plurality of basic base band capacity unit together. According to the present invention, all the units in the BBU, including the transmission unit, the Main Processing & Timing unit, the base band signal processor unit and the interface unit, for example, are integrated on a single board which is 1 U high or even lower than 1 U. Then place the single board in an independent BBU box, thus reducing the size and weight of the BBU. Therefore, according to the actual needs, the BBU in the present invention can be installed freely in a standard cabinet with space being 19-inch wide and 1 U or higher than 1 U, in macro base station transmission device cabin or in other non-standard installation spaces. And distributed installation of the plurality of BBUs can be achieved with cable connection. That means that any cabinet may house the BBU in accordance with embodiments of the present invention as long as the cabinet has 1 U high spare space, thereby more flexible, more practical, and lower installation and service cost. Difficulties to find new station sites and expensive rent for station sites may be avoid, due to using the empty space of the existing stations.

Additionally, in accordance with embodiments of the present invention, the base band RF interface for connecting the BBU to the RFU and the capacity expansion interface for achieving the fully-connected topology of the BBU are set in the interface unit of the BBU. Through base band RF interfaces, BBUs and RFUs can accomplish data intercommunication and achieve a plurality of networking modes for the base station, such as a ring networking, a star networking, and a chain networking; through capacity expansion interfaces, BBUs can achieve self-cascading and BBU backup. Thus, it not only solves small capacity of mini BBU, and ensures timely expansion of the BBU capacity according to actual application needs, but also enhances flexibility for the BBU capacity expansion and new business features expansion, and lowers cost as well. Meanwhile, setting master and standby BBUs also can improve operational reliability of the base station.

BRIEF DESCRIPTION OF THE DRAWINGS

FIG. 8 (b) is a schematic diagram illustrating a second embodiment of network structure of BBU and RRU in the present invention;

FIG. 8 (c) is a schematic diagram illustrating a third embodiment of network structure of BBU and RRU in the present invention;

FIG. 8 (d) is a schematic diagram illustrating a fourth embodiment of network structure of BBU and RRU in the present invention;

FIG. 8 (e) is a schematic diagram illustrating a fifth embodiment of network structure of BBU and RRU in the present invention;

FIG. 8 (f) is a schematic diagram illustrating a sixth embodiment of network structure of BBU and RRU in the present invention;

DETAILED DESCRIPTION OF THE INVENTION

In the base station, according to preferred embodiments of the present invention, the base band part is separated from the RF part to respectively form a base band unit and an RF unit, and base band RF interfaces are configured on the RFU for interconnecting with the BBU and transmitting data information, thereby forming a distributed base station system. Based on the separation of the BBU and the RFU, the capacity of BBU is further divided. Each of the BBU may be arranged independently, so that each BBU can support a minimum configuration and a plurality of BBUs in combination can support the capacity as a macro base station. In accordance with the embodiments of the present invention, the transmission unit, the master controller & clock synchronous unit, the baseband signal processing unit and the interface unit are highly integrated in the BBU, e.g. are integrated on a single board, and the board is put in a small BBU cassette to form an on-the-spot replaceable unit. Through capacity expansion interfaces and base band RF interfaces provided by the BBU interface unit, networking and capacity expansion among BBUs and among BBUs and RFUs in flexible and convenient ways may be achieved, backup functions based on a plurality of BBUs also may be achieved. In this way, the operational reliability of the base station may be enhanced and the base band unit backup cost in traditional base stations may be lowered.

The BBU in the distributed base station system and the networking methods in accordance with the embodiments of the present invention may be applied to a plurality of mobile communication modes, such as WCDMA, CDMA2000, TD-SCDMA, and GSM, and also may be applied to a wide band wireless access (WBA). The technical solution of the present invention is explained in detail as follows by taking the WCDMA system as an example.

The technical solution of the present invention will be described in detail hereinafter with reference to accompanying drawings and preferred embodiments.

It is noted that the RFU in the embodiments of the present invention, used for converting signals between RF signals and base band signals and transmitting RF signals, includes an RF signal processing unit, a power amplifier unit and a duplexer. The RFU may be either a near-end RFU, or a radio remote unit (RRU) connected with the BBU via such transmission medium as optical fibers or electrical cables. The near-end RFU and the RRU both have base band RF interfaces for interconnecting with BBUs, other RFUs and other RRUs. The base band RF interfaces may be high-speed digital interfaces, common public radio interfaces (CPRI), other standard interfaces, or self-defined interfaces. In the following embodiments, the RFU adopts the RRU to forms a mixed networking mode. In actual applications, the RFU may be a near-end RFU, or a combination of a near-end RFU and an RRU to form a mixed networking mode.

Figure 1:
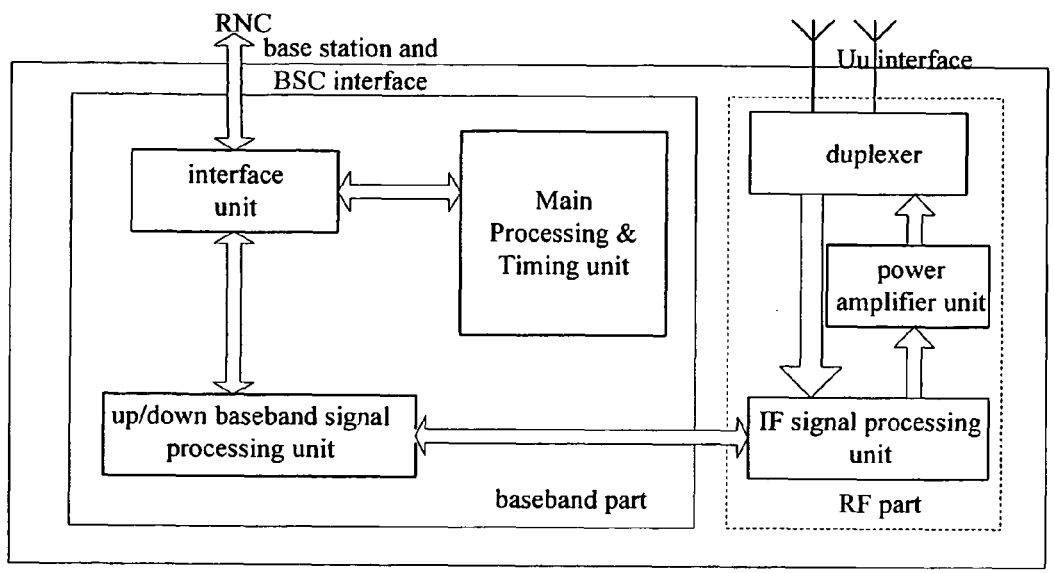
FIG. 1 is a schematic diagram illustrating the structure of a base station in a mobile communication system.
Figure 2:
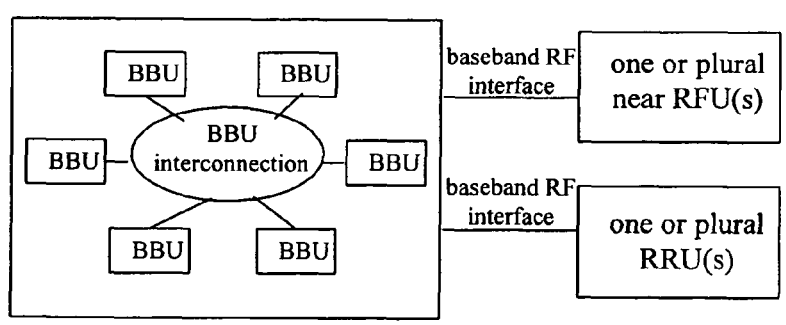
FIG. 2 is a schematic diagram illustrating a network structure of a distributed base station system in accordance with a preferred embodiment of the present invention.

FIG. 2 is a schematic diagram illustrating a network structure of a distributed base station system in the preferred embodiment of the present invention. As shown in FIG. 2, the separated BBU and RFU may be networked with their respective interfaces in flexible ways. The RFU may be a near-end RFU or an RRU. FIG. 2 does not indicate the specific capacity expansion interconnection methods of the BBU. In actual applications, interconnection of BBUs illustrated in FIG. 2 may be implemented by directly connecting BBUs via cables or optical fibers to form various network topological structures, or by connecting a plurality of BBUs via additional exchange BB cassettes to form various network topological structures, such as a star network, a chain network, a ring network and so on. The network may be composed in many flexible ways, which will be explained in the following description in detail. The networking modes between RFUs and BBUs in FIG. 2 are only an exemplary description. In actual applications, the networking methods are not limited to these modes, which will be explained in detail in the following implementation ways. In FIG. 2, the BBUs are connected with one or a plurality of near-end RFU(s) or RRU(s) via base band RF interfaces. Similarly, a plurality of near-end RFUs or RRUs can form various network topological structures with their own interconnection interfaces, which are not indicated in FIG. 2, and the specific networking modes will be supplied in the following embodiments. In the embodiments of the present invention, both BBUs and the RFUs include two or more than two units.

Figure 3:
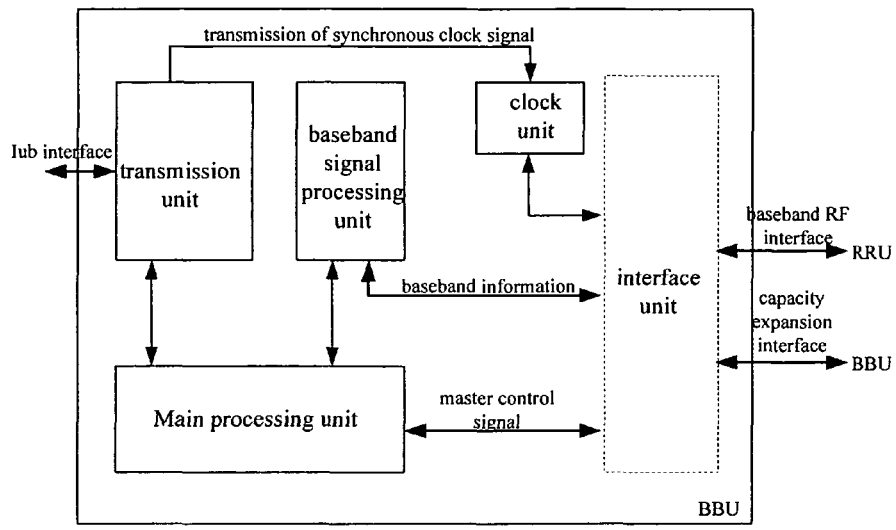
FIG. 3 is a schematic diagram illustrating a BBU composition structure of a distributed base station system in accordance with a preferred embodiment of the present invention.

FIG. 3 is a schematic diagram illustrating a BBU composition structure of the distributed base station system in the preferred embodiment of the present invention. In FIG. 3, the main processing unit and the clock unit are collectively called the Main Processing & Timing unit. As shown in FIG. 3, the BBU of the preferred embodiment includes the transmission unit, the Main Processing & Timing unit, the base band signal processing unit, and the interface unit. All the units are integrated on a single board or in an on-the-spot replaceable unit, which is placed in an independent BBU cassette. The BBU cassette may be 1 U high so that in actual applications, according to actual needs, the BBU cassette may be installed in a standard cabinet, in a macro base station transmission device cabin with an installation space of 19 inches wide and 1 U or more high, or in any other non-standard installation space in flexible ways. The height of the BBU cassette may be changed in flexible ways according to actual needs, and dispersed installation of a plurality of BBUs may be achieved via cables. In the above, 1 U is a measurement unit of thickness or height, and 1 U=1.75 inches=44.5 mm.

Figure 4:
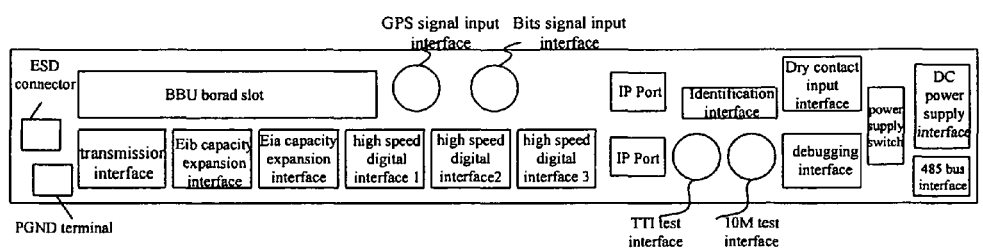
FIG. 4 is a schematic diagram illustrating a BBU interface in accordance with a preferred embodiment of the present invention.

In FIG. 3, the transmission unit is connected with an RNC via an Iub interface to accomplish data information intercommunication between BBUs and the RNC. In this case, if the preferred embodiment of the present invention is applied to other communication systems, the transmission unit is connected with the BSC of the corresponding mobile communication system via standard interfaces in the applied mobile communication system. The Main Processing & Timing unit serves to accomplish base station control functions and signaling and traffic data exchange control among the units in the base station, and simultaneously provide a clock reference to the BBU or the capacity-expanded BBU according to configuration needs. The base band signal processing unit serves to accomplish the processing of symbol-level and chip-level digital signals in physical layer, and intercommunicate digital base band signals with IF signal processing units. The interface unit serves to provide various interfaces to support intercommunication between BBUs and external data, e.g., connecting and networking with RRUs, expanding capacity of BBUs, debugging the base station, resetting the base station, identifying the type of the base station and the position of the installation slot, intercommunicating data between BBUs and the RNC, various testing and inputting synchronous clocks. As shown in FIG. 4, the interface unit includes the following units.

A power supply interface serves to connect with an external DC/AC power supply to supply operation power for the base station.

A debugging interface provides interfaces as serial ports and network ports to achieve management and maintenance of the base station by external equipments or service personnel.

An identification interface serves to mark the type of the base station in the base station system and mark the position of the slot where the BBU cassette is located. Based on input messages from the identification interface, the main processing unit of the BBU should identify the type of the base station and the position of the present slot where the BBU cassette is located. Different positions of slots correspond to different preset slot position labels, and different preset slot position labels serve to mark operation states of BBUs, e.g., the master BBU that works in an active state, the standby BBU that works in a standby state, or the slave BBU that works in a slave state. The identification interface may use DIP switches or ID interfaces of cables to achieve the identification function. In a network of the base station system, different distributive ways of BBUs correspond to different types of base stations. For example, BBUs interconnected with each other are located at the same base station site or at different base station sites corresponding to different bases station types.

The BBU that works as a master BBU can configure slave BBUs or standby BBUs according to the preset configuration circumstance, e.g. assigns one or all slave BBU(s) to process transmission data, and assigns a certain slave BBU to process specified subscriber channels; or configures a certain BBU that takes part in networking to process the data of a specified RRU.

The reset interface is a reset button/switch and serves to reset the base station. When the reset button/switch is pressed, the main processing unit receives a reset signal and reboots the system.

One or a plurality of base band RF interface(s), with each of the interfaces connected with one RRU, serve(s) to receive the uplink base band data transmitted by the RRU, and transmit downlink base band data from the BBU to the RRU. Base band RF interfaces may be CPRI, other standards interfaces, or self-defined interfaces. BBUs and the RRUs are connected via the base band RF interfaces by such transmission mediums as optical fibers or electrical cables. The base band RF interfaces also may be directly connected with near-end RFUs to form a mixed type network including local RFs and radio remote units.

The transmission interface, which serves to connect the RNC to the BBU to achieve base station data intercommunication between the BBU and the RNC, supports a plurality of such transmission interfaces as E1/T1, and recovers a circuit clock as the work clock of the BBU from a plurality of such interfaces code streams as E1/T1 code stream, E3/T3 code stream, and STM-1 code stream. When the transmission interface is used as ATM interface, it can accomplish mapping of a plurality of transmission interfaces from ATM cell to E1/T1. The transmission interface is not limited to an ATM interface, it also may be an interface that conforms to other protocols, such as IP.

The warning bus interface serves to connect equipment including RS485 interface and performs data collection functions. For example, the warning bus interface may be connected with an intelligent power supply to monitor operation state of the intelligent power supply, and the interface may be built in the power supply interface. The warning bus interface may be expanded by the existing interface chips. The interface expansion may include commonly known expansion methods in the prior art, which will not be further described here.

The Dry Contact input interface serves to expand input Dry Contact functions of the base station and performs warning test of the Dry Contact. The expansion of the Dry Contact input interface may include commonly known expansion methods in the prior art, which will not be further described here.

The power supply switch serves to control power on and power off of the BBU.

The test interface includes a 10M test interface for outputting 10M test synchronous clock signals to facilitate connection with relevant test instruments and includes a transmission time interval (TTI) test interface for output of TTI signals to facilitate test of RF 141 protocol.

The signal input interface includes a GPS signal input interface for receiving GPS synchronous clock signals; a Bits signal input interface for receiving 2M synchronous clock signals. It is noted that the BBU may simultaneously have the GPS signal input interface and the Bits signal input interface, or have at least one of the interfaces according to actual needs.

The Capacity expansion interface includes a high speed digital interface, a clock synchronous interface, and an active/standby switchover control interface. Each capacity expansion interface is connected with a BBU for interconnecting among the BBUs to expand BBU capacity, achieving clock synchronization among the interconnected BBUs, and transferring such information as base band information, transmission information and master controller information among the interconnected BBUs. The base band information includes base band IQ data, function control data, and so on. The transmission information is the relevant information from the RNC while the master controller information is the control information from the main processing unit.

The electrostatic discharge (ESD) connector serves to connect an ESD wrist strap, and the protect ground (PGND) terminal serves to connect a protective earth wire.

In addition, in order to display the BBU operation states, the BBU interface unit in accordance with the embodiments of the present invention also provides state indicators for indicating whether the power supply is normal or not, the interface of the BBU is normal or not, and etc. The number of the state indicators depends on actual needs.

In actual applications, each of the above-mentioned interfaces corresponds to an interface terminal on the BBU cassette panel and the installation positions of all the interface terminals may be arranged randomly on the panel.

Figure 5:
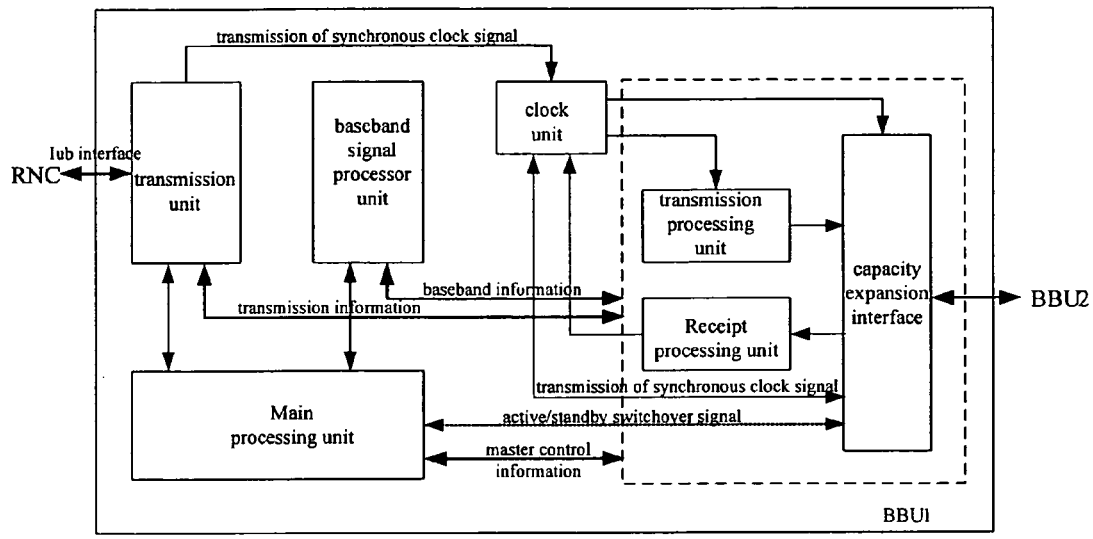
FIG. 5 is a schematic diagram illustrating the connection of a BBU capacity expansion interface in accordance with a preferred embodiment of the present invention.

Among all the above-mentioned interfaces, the capacity expansion interface and the base band RF interface are important for capacity expansion and networking of the BBU. FIG. 5 is a schematic diagram illustrating the connection of the BBU capacity expansion interface in accordance with the embodiments of the present invention. As shown in FIG. 5, when two BBUs are interconnected, on the assumption that the BBU with a capacity expansion interface is BBU1 and the BBU connected to the BBU1 via the capacity expansion interface is BBU2, then the BBU1 and the BBU2 share some information as the master control information of the main processing unit, the transmission information of the transmission unit, the base band information of the base band signal processing unit and the master control information of the main processing unit via a transmission processing unit and a reception processing unit. That is, the BBU1 transmits the master control information, the transmission information, or the base band information to the BBU2 via the transmission processing unit and the BBU1 receives the master control state report information, the transmission information, or the base band information from the BBU2 via the reception processing unit. The capacity expansion interface is connected with the clock unit to achieve clock synchronous functions. The transmission/reception processing unit is connected with the capacity expansion interface to accomplish signal conversion functions mainly, such as conversion between signal protocols, conversion between electrical signals and optical signals, etc.

Additionally, if there is no active/standby switchover control signals between the main processing unit and the capacity expansion interface, on the assumption that the BBU1 with the capacity expansion interface is set as a master BBU by using a DIP switch, while the BBU2 is set as a slave BBU by using a DIP switch, the BBU1 and the BBU2 are connected via the capacity expansion interface and form a master-slave mode, in which BBU1 and BBU2 are both in operation state and work by sharing information. In this manner, capacity of the BBU is increased. In this case, the capacity expansion interface with no active/standby switchover control signals may be called an Eib capacity expansion interface. The Eib interface serves to transmit base band information, transmission information, master control information and clock signals. In actual applications, there may be single or a plurality of Eib interface(s).

If there exists active/standby switchover control signal between the main processing unit and the capacity expansion interface, as shown in FIG. 5, on the assumption that the BBU1 with the capacity expansion interface is set as a master BBU by using the DIP switch, while the BBU2 is set as a standby BBU by using the DIP switch, the BBU1 and the BBU2 are connected with each other via the capacity expansion interface and form a master-standby mode. In normal cases, the BBU1 and the BBU2 work in load-share backup operation mode with data shared between them. Similar to the master-slave operation mode, the BBU2 operation states are the same as the BBU1 except some functions. For example, the reference clock information is provided by the BBU1. When the main processing unit of the BBU1 fails, the BBU1 degrades itself to standby state automatically by the master-standby switchover control signal, and the BBU2 upgrades to a master BBU when it detects the degradation of BBU1 so as to promote operational reliability of the base station. At the same time, because the standby BBU is in hot backup operation state, the BBU capacity may be expanded simultaneously so as to achieve the object of BBU capacity expansion. In this case, the capacity expansion interface with active/standby switchover control signals may be called an Eia capacity expansion interface, which serves to transmit base band information, transmission information, master control information, clock signals and active/standby switchover control signals. Compared to the Eib interface, the Eia interface has one more kind of active/standby switchover control signal, while other signals are similar. In actual application, there may be single or a plurality of Eia interface(s).

A plurality of BBUs may be connected with each other via capacity expansion interfaces by using optical fibers or electrical cables so as to achieve BBU capacity expansion conveniently.

The above-mentioned method to achieve data sharing among a plurality of BBUs via capacity expansion interfaces is that every BBU taking part in networking has a transmission unit which is connected to a logical module via a special parallel transmission interface to achieve transmission data sharing among BBUs. The logical module is located in the interface unit to achieve conversion between the ATM cell and the high speed data or between other cell and the high speed data. On the assumption that the BBU receiving uplink data from the RRU or downlink data from the RNC directly is a source BBU, and the BBU receiving the uplink/downlink data from the source BBU is a target BBU, so the actual method for data sharing is described as follows.

(1) For the downlink data, after receiving the data, the transmission unit of the source BBU converts the received data into ATM cell and exchanges the ATM cell to the logical module of the source BBU via the special transmission interface according to the target BBU address carried in the data. The logical module of the source BBU converts the ATM cell into high-speed data and transmits the high-speed data to the target BBU via the capacity expansion interface. The logical module of the target BBU receives the high-speed data via the capacity expansion interface and converts the received high-speed data into ATM cell, and then sends the ATM cell to the base band signal processing unit of the target BBU via the special transmission interface. The base band signal processing unit turns the received ATM cell into FP frames and processes the frames with corresponding code modulation to get a base band downlink data, and finally sends the base band downlink data to the RRU via the base band RF interface between the target BBU and the RRU.

(2) For an uplink data, the RRU sends the uplink base band data to the corresponding source BBU via the RF interface between the RRU and the BBU. After receiving the uplink base band data, based on the target BBU address carried in the uplink base band data, the logical module of the source BBU sends the received data to the target BBU via the high-speed data interface in the capacity expansion interface. The logical module of the target BBU receives the data via the capacity expansion interface and relays the data to the base band signal processing unit. The base band signal processing unit demodulates and transcodes the base band data, converts the transcoded data into ATM cell, and then sends the ATM cell to the transmission unit of the target BBU via the special transmission interface. The transmission unit processes the received ATM cell and gets the transmission uplink data, and finally sends the transmission uplink data to the RNC via the transmission interface between the target BBU and the RNC.

It should be noted that, the principles of data sharing, as above mentioned, are the same no matter if the source BBU and the target BBU have a master-slave relationship or a master-standby relationship. The difference is in that the switchover function is available between the master-standby BBUs but is not available between the master-slave BBUs.

Figure 6:
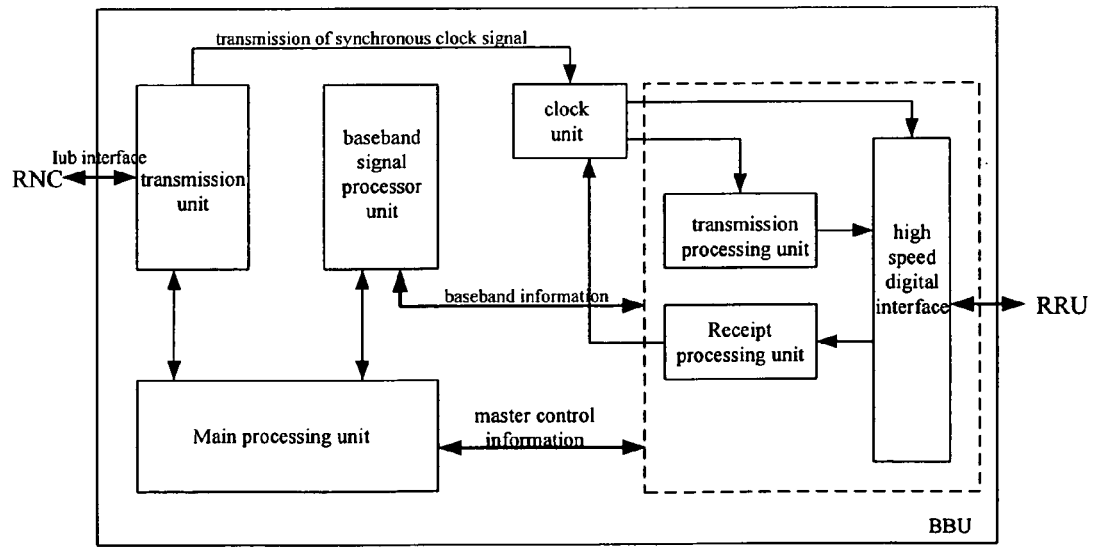
FIG. 6 is a schematic diagram illustrating the connection of a BBU base band RF interface in accordance with a preferred embodiment of the present invention.

FIG. 6 is a schematic diagram illustrating the connection of the BBU base band RF interface in accordance with embodiments of the present invention. Compared with FIG. 5, it is shown in FIG. 6 that the base band RF interface and the RRUs connected via the base band RF interface transmit base band information of the base band signal processing unit between them. That is, the BBU sends the base band information to the RRU via the transmission processing unit receives the base band information from the RRU via the reception processing unit. The transmission/reception processing unit is connected with the base band RF interface to accomplish such signal conversion functions as signal protocol conversion, format conversion between electrical signals and optical signals and etc. The RRUs are connected to each other via base band RF interfaces by using transmission medium like optical fibers or electrical cables so as to achieve the networking of the BBUs and the RRUs conveniently. Similarly, the base band RF interface may be connected to a near-end RFU to accomplish the same functions as well. Networking of the base station system may simultaneously include the near-end RFUs and the RRUs according to actual needs to form a mixed base station system.

The capacity expansion interface of the BBU provided in accordance with the embodiments of the present invention brings great convenience for the BBU capacity expansion and the base station networking, lowers cost and enhances operational reliability of the BBU. In the embodiment of the present invention, one or a plurality of BBU(s) and one or a plurality of RRU(s) may achieve various networking types, such as star network, ring network, chain network or mixed network. In the following networking schemes, the number of BBUs and RRUs is not limited to thereof. It may be planned according to the actual application conditions.

FIG. 7(a) is a schematic diagram illustrating star network with two BBUs and three RRUs in accordance with the embodiments of the present invention. As shown in FIG. 7(a), the BBU1 and the BBU2 may be connected via the Eia capacity expansion interface so that the BBU1 and the BBU2 have a master-standby relationship, or may also be connected via the Eib capacity expansion interface so that the BBU1 and the BBU2 have a master-slave relationship. The BBUs and the RRUs are connected via base band RF interfaces. Each BBU may provide a plurality of base band RF interfaces for RRUs. For example, the BBU1 and the BBU2 in FIG. 7(a) have three base band RF interfaces respectively. Thus the BBU1 and the BBU2 may be connected with at least three RRUs respectively.

Figure 7:
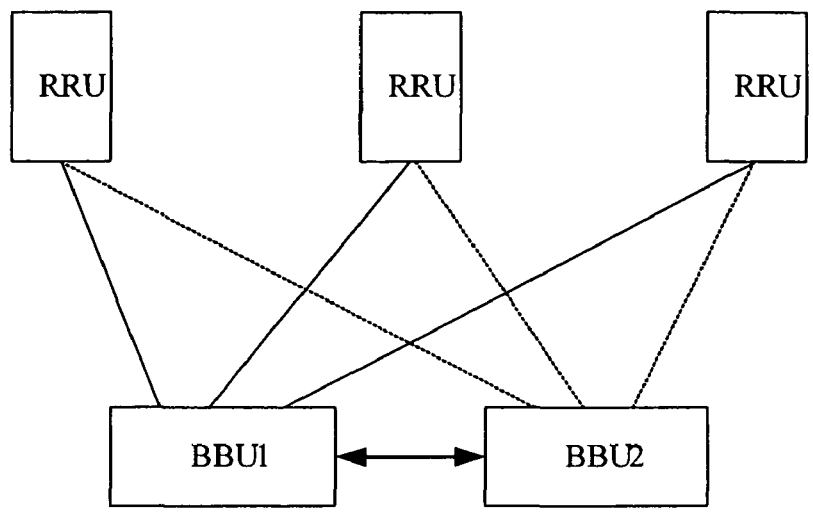
FIG. 7(a) is a schematic diagram illustrating a star network of BBU and RRU in accordance with a preferred embodiment of the present invention.
FIG. 7(b) is a schematic diagram illustrating a ring network of BBU and RRU in accordance with a preferred embodiment of the present invention.
FIG. 7(c) is a schematic diagram illustrating a chain network of BBU and RRU in accordance with a preferred embodiment of the present invention.
FIG. 7(d) is a schematic diagram illustrating a composition network of BBU and RRU in accordance with a preferred embodiment of the present invention.
Figure 7:
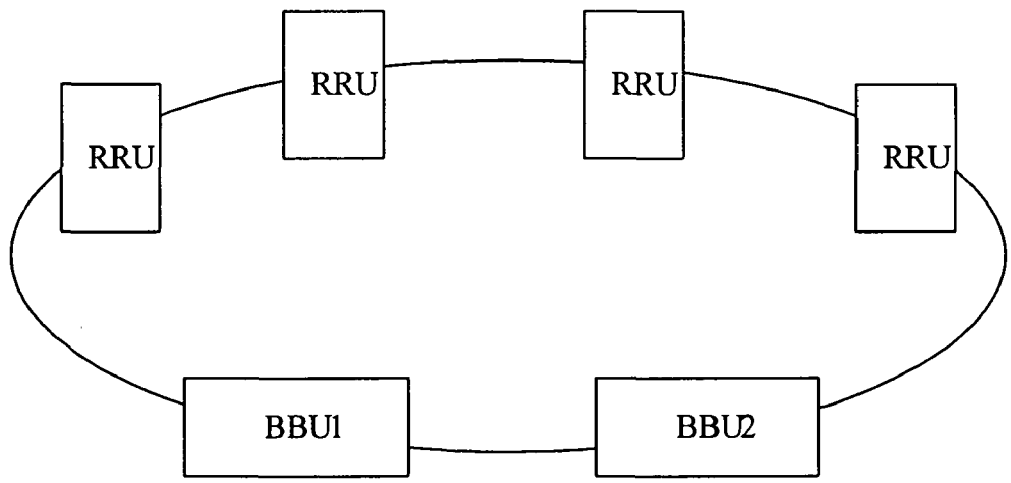
Figure 7C:
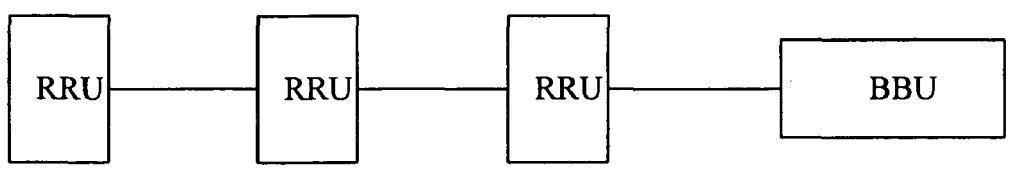
Figure 7:
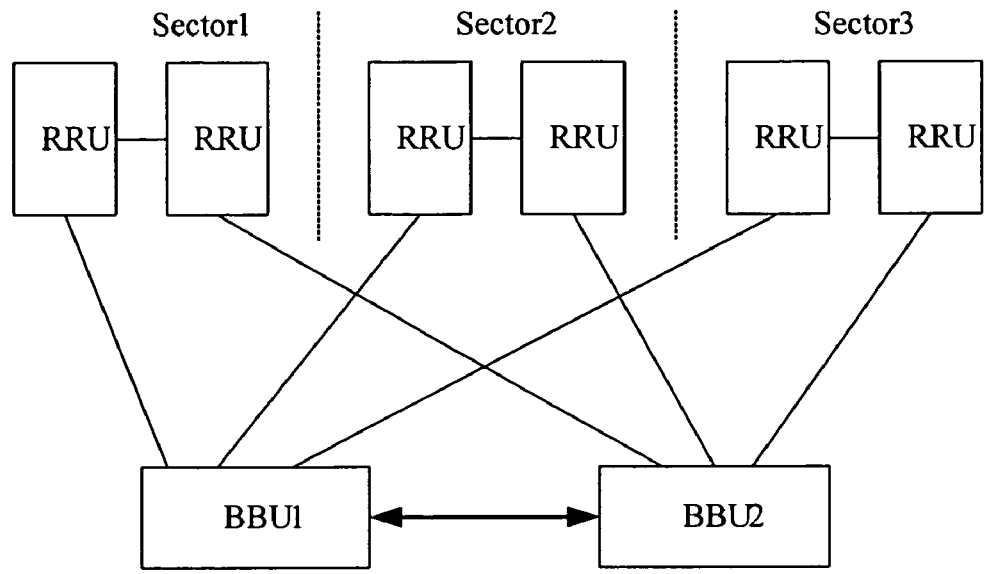

FIG. 7 (b) is a schematic diagram illustrating a ring network with two BBUs and four RRUs in accordance with the embodiments of the present invention. Similarly, the BBU1 and the BBU2 form a network with master-slave relationship by being connected via the Eib capacity expansion interface. The BBU1 is connected with one RRU via the base band RF interface, and the BBU2 is connected with another RRU via the base band RF interface. The RRUs are consecutively interconnected via base band RF interfaces. In this way, the two BBUs and four RRUs form a ring network. In this case, the network capacity is the sum of the two BBUs' capacities. If the BBU1 and the BBU2 are connected via the Eia capacity expansion interface and have a master-standby relationship, all the functions and capacity of the network formed with Eib interface may be achieved, furthermore, backup function is also provided for the network so as to enhance operational reliability of the whole base station.

FIG. 7 (c) is a schematic diagram illustrating a chain network with one BBU and three RRUs in accordance with the embodiments of the present invention. The base band RF interface of the BBU is connected with a certain RRU, The RRUs are consecutively connected via corresponding interfaces. In this manner, one BBU and three RRUs form a chain network. In this case, the Eib capacity expansion interface of the BBU may be used to expand the BBU capacity or the Eia capacity expansion interface of the BBU may be used for the BBU backup.

FIG. 7 (d) is a schematic diagram illustrating a mixed network with two BBUs and six RRUs in accordance with the embodiments of the present invention. As shown in FIG. 7 (*d*), there are two RRUs in each sector, and each RRU is connected with BBU respectively. With regard to each sector, RRUs and BBUs in each sector form a ring network supporting double-RRU configuration. With regard to a plurality of sectors, star network connection is adopted among sectors. Therefore, the networking mode illustrated in FIG. 7 (*d*) is a method for achieving mixed network. The BBU1 and the BBU2 may have a master-standby relationship or a master-slave relationship.

In the following, a star networking mode formed by the RRUs and the BBUs each of which respectively has two capacity expansion interfaces and three base band RF interfaces, is taken as an example for a specific description of the scheme to achieve the capacity expansion of BBUs with RRUs. Herein, it is assumed that one of the two capacity expansion interfaces is the Eia interface and the other is the Eib interface.

Figure 8:
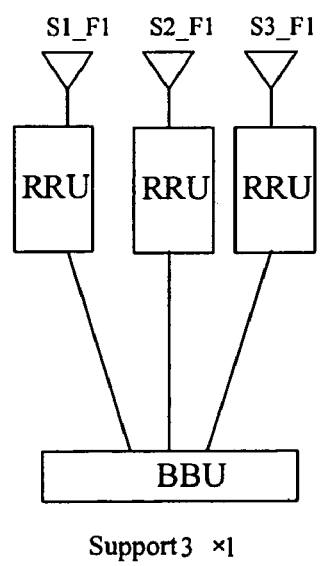
FIG. 8 (a) is a schematic diagram illustrating a first embodiment of network structure of BBU and RRU in the present invention.
Figure 8:
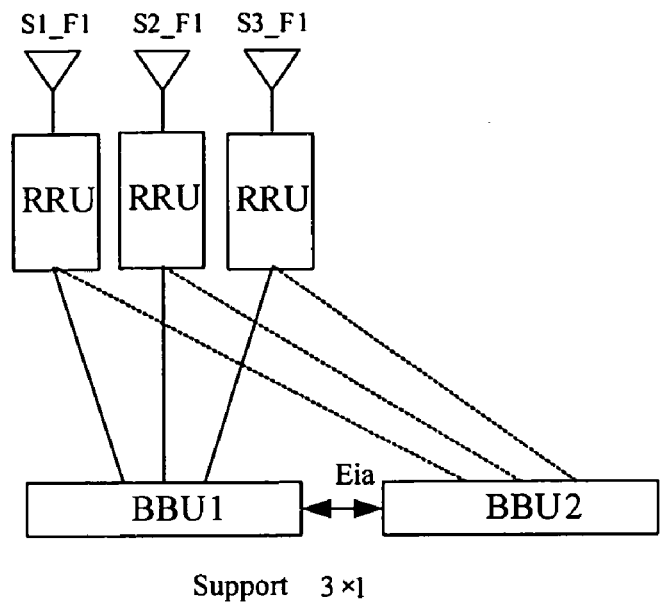
Figure 8C:
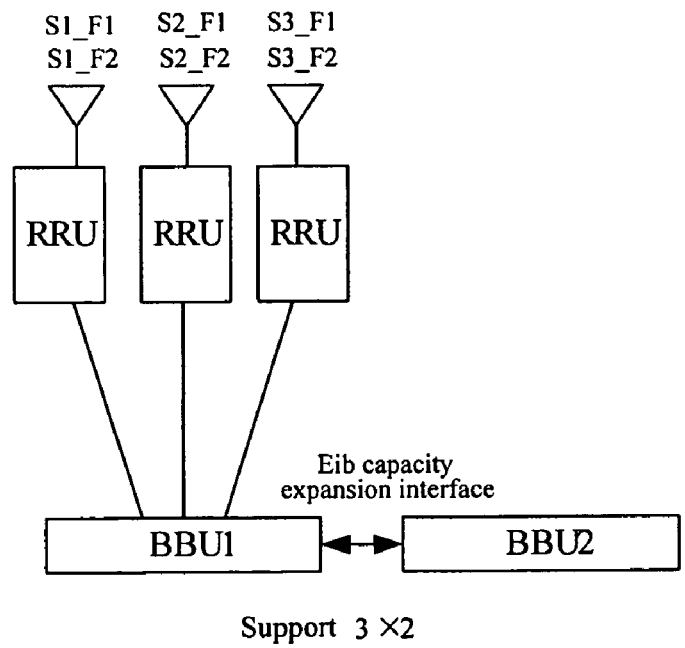
Figure 8:
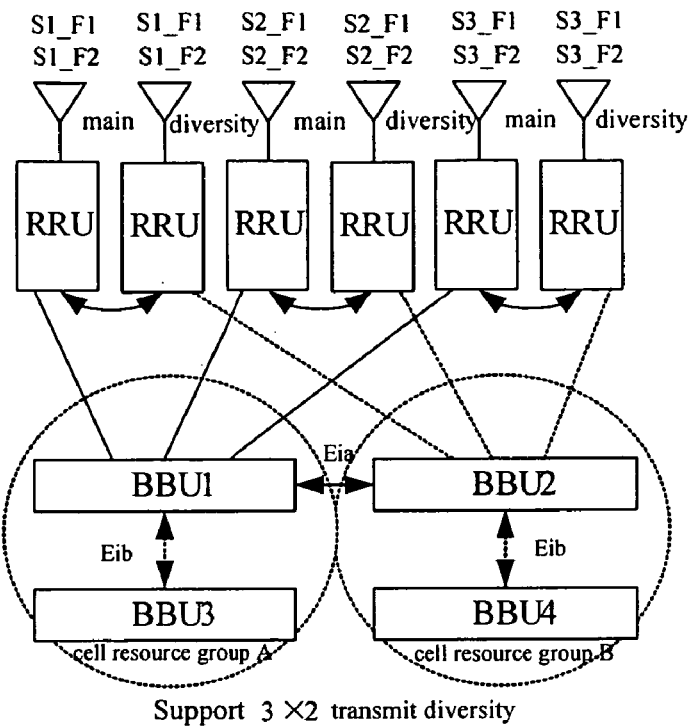
Figure 8:
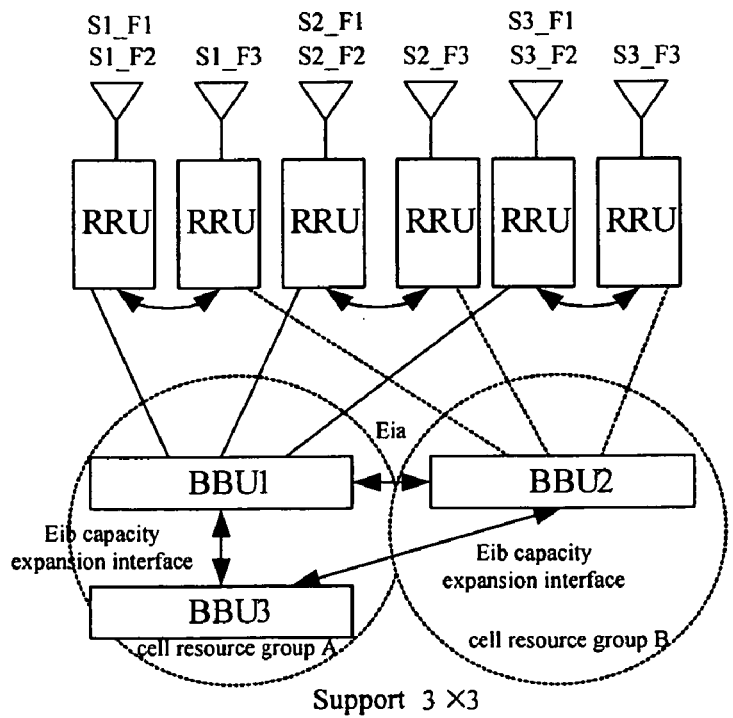
Figure 8:
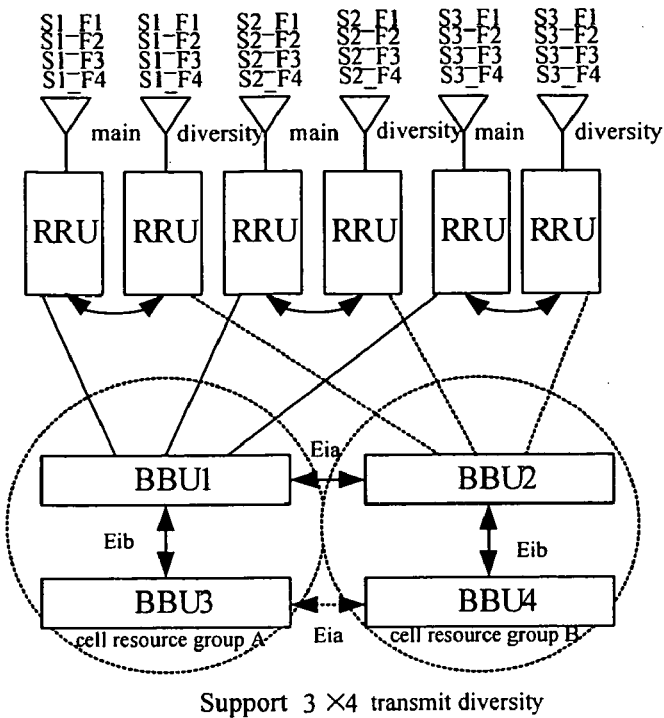

FIG. 8 (*a*) is a schematic diagram illustrating the first embodiment of the network structure with one BBU and three RRUs. As shown in FIG. 8 (*a*), one BBU and three RRUs are connected respectively via a base band RF interface. Each of the RRUs belongs to a sector, and each of the RRUs adopts a networking configuration with single carrier wave. That is, the networking mode illustrated in FIG. 8 (*a*) supports networking of 3×1 configuration, in which 3 refers to 3 sectors, and 1 means single carrier wave.

FIG. 8 (*b*) is a schematic diagram illustrating the second embodiment of network structure with two BBUs and three RRUs in the present invention. As shown in FIG. 8 (*b*), the BBU1 and the RRU2 are connected via an Eia capacity expansion interface to form network with master-standby relationship. The BBU1 and the BBU2 are connected with three RRUs respectively via three base band RF interfaces respectively, each of the RRUs belongs to a sector, and each of the RRUs adopts a networking configuration with single carrier wave backup. That is, the networking mode illustrated in FIG. 8 (*b*) supports networking of 3×1 configuration, in which 3 refers to 3 sectors, and 1 means single carrier wave. Suppose that the slot position label of the BBU1 is preset as a master BBU identifier, and the slot position label of the BBU2 is preset as a standby BBU identifier, then, the operation principles of the networking in FIG. 8 (*b*) are described as follows. After accomplishing the networking as illustrated in FIG. 8 (*b*), in normal cases, the BBU1 and the BBU2 are in independent operation state. The BBU2 is in hot backup operation state, and the main processing unit of the BBU1 controlling the whole system, while the BBU1 and the BBU2 share data through the capacity expansion interfaces. The specific ways to achieve capacity expansion interfaces and to achieve data sharing have been introduced in the above, so no more description is provided here. When the main processing unit of the BBU1 fails, the BBU1 reboots automatically, and simultaneously sends an active/standby switchover control signal to the BBU2. The BBU2 works as the master BBU, and the main processing unit of the BBU2 controls the whole system, while the BBU1 is degraded to the standby BBU for operation. The operation states of each BBU will be reported to the RNC after failure occurs so as to facilitate personnel in taking opportunity measures.

It should be noted that the active/standby switchover function occurs only when the main processing unit fails. When the other units, such as the base band signal processing unit, or the base band RF interface, or the capacity expansion interface fails, the active/standby switchover function is not generally performed. For example, when the base band signal processing unit or the base band RF interface is out of order and affects configuration conditions of the present network, the active/standby switchover function can do no help at all. In this case, even if the BBU1 is degraded to the standby BBU, communication between the BBU1 and the RRU has been interrupted, and normal operation can not be maintained any longer. Therefore, in such a case, what is needed only is that the BBU reports the failure to the RNC.

FIG. 8 (*c*) is a schematic diagram illustrating the third embodiment of network structure with two BBUs and three RRUs. As shown in FIG. 8 (*b*), the BBU1 and the RRU2 are connected via an Eib capacity expansion interface and form a network with master-slave relationship. The BBU1 are connected with three RRUs respectively via three base band RF interfaces. Each of the RRUs belongs to a sector, and each of the RRUs adopts a network configuration with two-carrier wave. That is, the networking mode illustrated in FIG. 8 (*c*) supports networking of 3×2 configuration, in which, 3 refers to 3 sectors, and 2 means 2 carrier waves. Since the BBU1 and the BBU2 have a master-slave relationship, the BBU uplink/downlink data capacity is increased to twice of that when a single BBU is used.

The operation principles of networking illustrated in FIG. 8 (*c*) are completely the same as those in FIG. 8 (*b*). The difference between them is in that in FIG. 8 (*c*), failure of the BBU1 is only reported to the RNC with no backup function, no matter what kind of failure it is.

On the basis of the above mentioned BBU master-standby relationship and BBU master-slave relationship for expanding capacity, the BBUs in accordance with the embodiments of the present invention may achieve many flexible ways for expanding capacity by using various networking modes. Several ways are listed in the following with reference to the accompanying drawings.

FIG. 8 (*d*) is a schematic diagram illustrating the fourth embodiment of network structure with four BBUs and six RRUs. As shown in FIG. 8 (*d*), the BBU1 and the BBU2 are connected via an Eia capacity expansion interface to form network with master-standby relationship. The six RRUs are divided into groups with two RRUs belonging to each group to form a main-and-diversity mode. The BBU1 is connected with three main RRUs via three base band RF interfaces respectively, while the BBU2 is connected with three diversity RRUs via three base band RF interfaces respectively. Two RRUs belong to one sector, and this networking mode supports three sectors, in which, every RRU adopts a network configuration with two-carrier wave backup. That is, the networking mode illustrated in FIG. 8 (*d*) supports backup networking of 3×2 transmit diversity configuration, in which, 3 refers to 3 sectors and 2 means 2 carrier waves.

If the BBU1 and the BBU3 are connected via the Eib capacity expansion interface to form a network with master-slave relationship, the BBU2 and the BBU4 are connected via the Eib capacity expansion interface to form a network with master-slave relationship, the networking mode supports three sectors. In which, every RRU adopts a network configuration with two-carrier wave backup. That is, the networking mode supports backup networking of 3×2 transmit diversity configuration, in which, 3 refers to 3 sectors and 2 means 2 carrier waves. Herein, Eia capacity expansion interfaces may be used between the BBU1 and the BBU3 and between the BBU2 and the BBU4 to form a network with master-standby relationship. In such conditions, the main processing unit of the BBU1 or the BBU2 shields the active/standby switchover control signal sent to the BBU3 or the BBU4, where the shielding means that the main processing unit sets the active/standby switchover control signal invalid.

FIG. 8 (e) is a schematic diagram illustrating the fifth embodiment of network structure with three BBUs and six RRUs. As shown in FIG. 8 (e), the BBU1 and the BBU2 are connected via an Eia capacity expansion interface to form a network with master-standby relationship, the BBU1 and the BBU3 are connected via an Eib capacity expansion interface to form a network with master-slave relationship, and the BBU2 and the BBU3 are connected via an Eib capacity expansion interface to form a network with master-slave relationship. Six RRUs are divided into groups with two RRUs belonging to each group. The BBU1 is connected to one RRU of every group respectively via the base band RF interface. The BBU2 is connected to the other RRU of every group respectively via the base band RF interface. Two RRUs belong to one sector, and this networking mode supports three sectors, in which every group of RRUs adopts a network configuration with three-carrier wave backup. That is, the networking mode illustrated in FIG. 8 (e) supports the backup networking of 3×3 configuration, in which, the first 3 refers to 3 sectors, and the second 3 means 3 carrier waves.

FIG. 8 (f) is a schematic diagram illustrating the sixth embodiment of network structure with four BBUs and six RRUs. As shown in FIG. 8 (f), the BBU1 and the BBU2 are connected via an Eia capacity expansion interface to form a network with master-standby relationship. The BBU1 and the BBU3 are connected via an Eib capacity expansion interface to form a network with master-slave relationship. The BBU2 and the BBU4 are connected via an Eib capacity expansion interface to form a network with master-slave relationship. The BBU3 and the BBU4 are connected via the Eia capacity expansion interface to form a network with master-slave relationship. It should be noted that the active/standby switchover control signal between the BBU3 and the BBU4 is shielded when the BBU3 and the BBU4 are connected via an Eia capacity expansion interface. The six RRUs are divided into groups with two RRUs belonging to each group to form a main-and-diversity mode. The BBU1 is connected with the three main RRUs respectively via three base band RF interfaces, while the BBU2 is connected with the three diversity RRUs via three base band RF interfaces respectively. The networking mode supports three sectors, in which, every RRU adopts a network configuration with four-carrier wave backup. That is, the networking illustrated in FIG. 8 (f) supports the backup networking of 3×4 transmit diversity configuration, in which, 3 refers to 3 sectors, and 4 means 4 carrier waves.

With regards to BBUs only, there are different ways for expanding capacity among a plurality of BBUs, which will be described in detail hereinafter with reference to the accompanying drawings.

Figure 9:
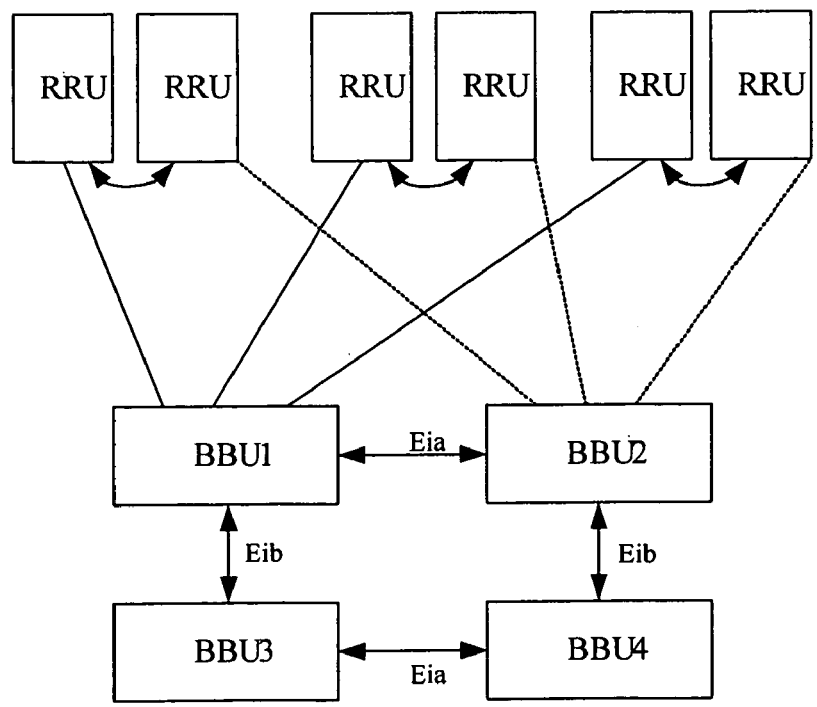
FIG. 9 is a schematic diagram illustrating a ring network of a plurality of BBUs in accordance with a preferred embodiment of the present invention.

FIG. 9 is a schematic diagram illustrating a ring network with four BBUs in accordance with the embodiment of the present invention. The BBU1 and the BBU2 are connected via an Eia capacity expansion interface to form a network with master-standby relationship. The BBU1 and the BBU3, the BBU2 and the BBU4 are respectively connected via Eib capacity expansion interfaces. The BBU3 and the BBU4 are connected via an Eia capacity expansion interface. In this way, the BBU1 and the BBU3 form a network with master-slave relationship, the BBU2 and the BBU4 form a network with master-slave relationship, and the BBU3 and the BBU4 form a network with slave relationship. Suppose that every capacity expansion interface of the BBU in FIG. 9 includes one Eia capacity expansion interface and one Eib capacity expansion interface, the master-slave relationship between the BBU3 and the BBU4 may be achieved via the Eia interface. Only the main processing unit of the BBU3 shields the active/standby switchover control signal that is sent to the capacity expansion interface connected with the BBU4. The master-slave relationship between the BBU3 and the BBU4 can also be achieved with an additional Eib interface added between the BBU3 and the BBU4.

In the interconnection scheme of BBUs in FIG. 9, every BBU may be connected via respective capacity expansion interfaces by using the transmission mediums like optical fires or electrical cables, and the capacity of base station system increases with the increase of BBUs quantity. This ring networking mode can achieve data sharing among BBUs with a small number of capacity expansion interfaces, and provide circuit protective functions due to the inherent ability of ring network.

Figure 10:
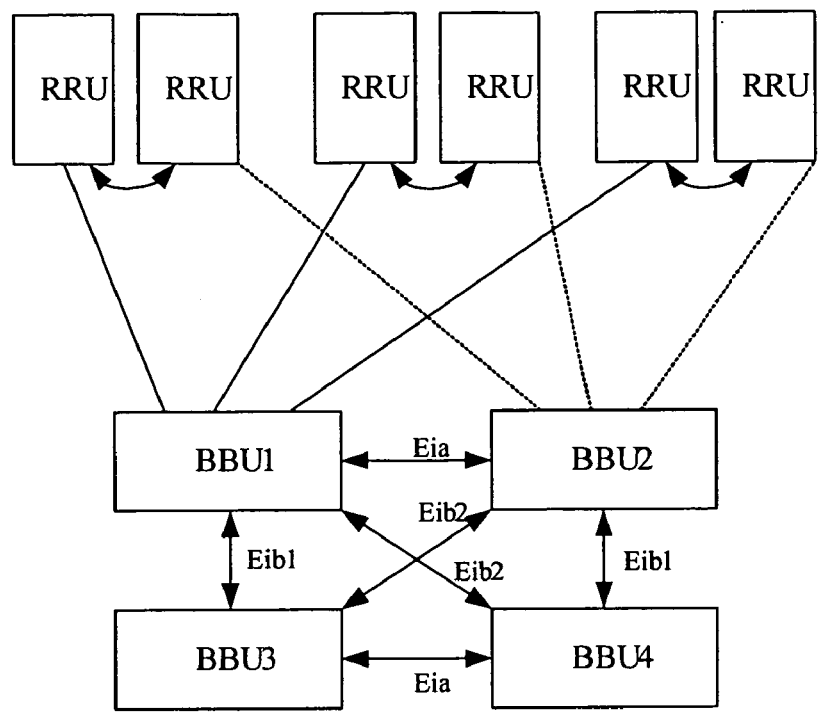
FIG. 10 is a schematic diagram illustrating a fully-connected topology of a plurality of BBU in accordance with a preferred embodiment of the present invention.

FIG. 10 is a schematic diagram illustrating a fully-connected topology of a plurality of BBUs in accordance with the embodiment of the present invention. Every BBU in FIG. 10 should respectively have at least one Eia interface and a plurality of Eib interfaces. The BBU1 and the BBU2 are connected via Eia capacity expansion interfaces to form a network with master-backup relationship. The BBU3 and the BBU4 are connected via the Eia capacity expansion interface that supports the active/standby switchover function but with the active/standby switchover function shielded, so that it only achieves information sharing between the BBU3 and the BBU4 but has no master-backup switchover function. The BBU1 and the BBU3, the BBU2 and the BBU4, the BBU1 and the BBU4 as well as the BBU2 and the BBU3 are all connected via Eib capacity expansion interfaces. It may be seen that every BBU in FIG. 9 should have at least one Eia interface and two or more Eib interfaces.

In the fully-connected topology of BBUs in FIG. 10, every BBU may be connected via respective capacity expansion interfaces by using the transmission mediums like optical fires or electrical cables, and the capacity of base station system increases with the increase of BBU quantity.

Figure 11:
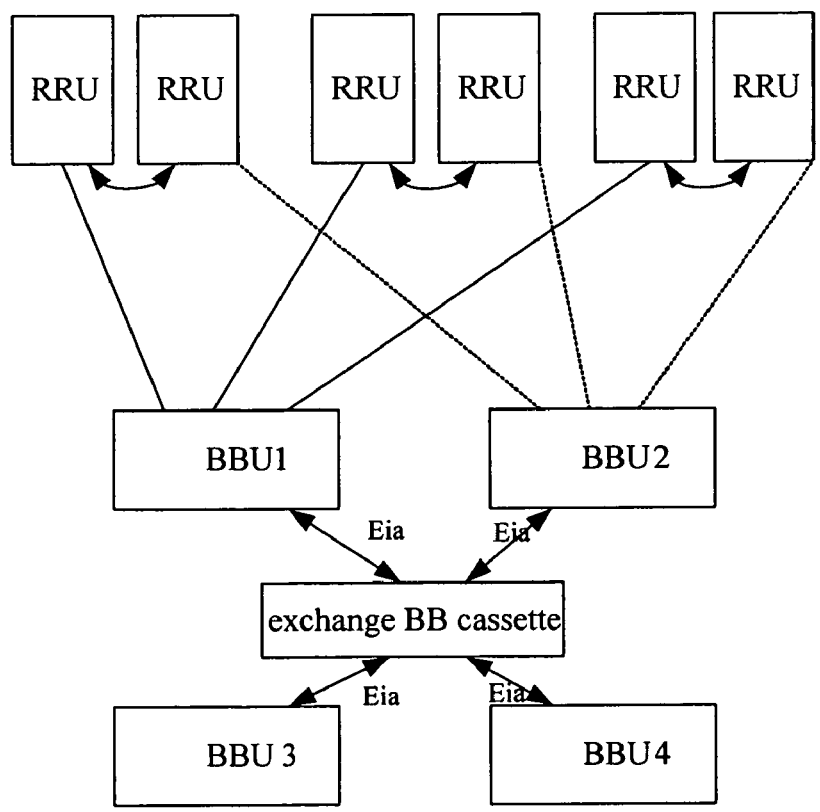
FIG. 11 is a schematic diagram illustrating another fully-connected topology of a plurality of BBU in accordance with another preferred embodiment of the present invention.

FIG. 11 is a schematic diagram illustrating another fully-connected topology of a plurality of BBUs in accordance with the embodiment of the present invention. In FIG. 11, one exchange BB cassette is added among four BBUs, and it helps achieving interconnection among BBUs. The exchange BB cassette provides a plurality of capacity expansion interfaces for connecting with BBU capacity expansion interfaces, identifies the nature of the BBU according to the slot position label of each BBU, and builds up electrical connection for active/standby switchover control signals between the master BBU and the backup BBU. It is not necessary to build up electrical connection for active/standby switchover control signals between the master BBU and slave BBUs, the standby BBU and the slave BBUs, or among slave BBUs. Data among these BBUs is transmitted by the exchange BB cassette, which transmits data to the corresponding BBU according to the address of the target BBU carried in the data.

In the fully-connected topology with four BBUs in FIG. 11, every BBU may be connected via respective capacity expansion interfaces by using the transmission mediums like optical fires or electrical cables. The capacity of the base station system may increase with the increase of BBU quantity. The exchanging BB cassette exchanges data among the BBUs to achieve point-to-point or point-to-multipoint information transmission. It is obvious that the exchanging BB cassette can help to reduce the number of BBU capacity expansion interfaces dramatically and lower the cost of the BBU when network composition becomes more complicated with increased number of BBUs.

In the BBU in accordance with the embodiment of the present invention, based on the capacity of base band part, the base band part of the base station is divided into a plurality of small capacity base band units that may be expanded in flexible ways. Due to its small capacity, a base band unit may be made very compactly in size so that it may be placed in a space-limited location to achieve the object of "to be invisible". Simultaneously, interconnection among a plurality of BBUs may be achieved with BBU capacity expansion interfaces, so as to help the system achieve the capacity of macro base station. Compared with the macro base station, the BBU in accordance with the embodiment of the present invention integrates the master control function, the base band function and the transmission function, and places all the interfaces of the master control function, the base band function and the transmission function on a single box, thereby reducing the equipment size and weight and expanding application scope of the equipment. Compared with the mini station, the BBU in accordance with the embodiment of the present invention, not only integrates the master control function, the base band function and the transmission function, but also provides interfaces for interconnection and expansion, which can achieve expansion and overlapping of the base band part to reach the capacity of the macro station, thereby further expanding application scope of the mini station.

It may be seen from the technical solution provided by the present invention that the BBU in accordance with the embodiments of the present invention may be dispersedly installed by downsizing design. Mobile communication operators, as long as they already have base station sites, can install BBUs in accordance with embodiments of the present invention directly in the remaining space of their outdoor macro base stations, or in the remaining space in the machine cabinets or frames of their indoor macro station machine rooms. They don't have to find additional base station sites. Simultaneously, because of the minimization and dispersed installation of equipments, the mobile communication operators can dramatically shorten their network construction time to achieve quick network construction.

The BBU cassette in accordance with the embodiments of the present invention is an independent device, which solves the problems of complicated installation, high requirements on weight bearing and high installation cost aroused by big size of traditional base station and heavy weight, and avoids the disadvantages of mini/micro base station's difficulties in capacity expansion as well as the problems to upgrade base band signal processing unit and RFU.

In accordance with the embodiments of the present invention, every BBU provides the transmission interface function, and a plurality of BBUs form distributed processing with their internal functional modules when they are interconnected, and can achieve networking in various modes with RRUs or near-end RFUs via BBU base band RF interfaces. Every part of the whole system has protection mechanism and the system is of simple structure and is easy to achieve backup with low backup cost, and it can well meet telecommunication equipment's requirements on base station's reliability in future.

In accordance with the embodiments of the present invention, equipments that the operators have already purchased and base station sites that the operators have already obtained may be used to reduce their future investment with further exploitation of the existing facilities' efficiency. Mobile communication operators can achieve multi-mode base stations at their existing base station sites and on their existing base station equipment, so that the operators can make full use of their existing investments and reduce repeated investments by utilization of the space in the existing equipment and the existing power supplies.

The distributed base stations disclosed in accordance with embodiments of the present invention may be applied but not limited to WCDMA products, CDMA2000 products, GSM products and BWA products, and etc.

The foregoing are only preferred embodiments of the present invention while the protection scope thereof is not limited to the above description. Any change or substitution, within the technical scope disclosed by the present invention, easily occurring to those skilled in the art should be covered by the protection scope of the present invention. Therefore, the protective range of the present invention should be determined by the protective range of Claims.

What is claimed is:

1. A distributed base station system, comprising: a first base band unit (BBU) in communication with a Radio Frequency unit (RFU); wherein the first BBU comprises: a main processing unit; a clock unit; a base band signal processing unit; a transmission unit; and an interface unit; wherein the interface unit is configured to intercommunicate digital base band signals with the base band signal processing unit; and intercommunicate master control information with the main processing unit; wherein the interface unit comprises a primary base band Radio Frequency (RF) interface; wherein the RFU comprises a secondary base band RF interface and the RFU is connected to the primary base band RF interface of the BBU; wherein the distributed base station system further comprises at least a second BBU; and wherein the interface unit of the first BBU further comprises a capacity expansion interface, configured to communicate with the second BBU; wherein the system further comprises an exchange base band (BB) cassette with a plurality of capacity expansion interfaces; the first BBU is connected with a capacity expansion interface of the exchange BB cassette via the capacity expansion interface of the first BBU; and the second BBU is connected with another capacity expansion interface of the exchange BB cassette.

2. The system according to claim 1, wherein the primary base band RF interface and the secondary base band RF interface both are high speed digital interfaces.

3. The system according to claim 1, wherein the capacity expansion interface is further configured to transmit the master control information or the base band signals from the first BBU to the second BBU.

4. The system according to claim 3, wherein the interface unit further comprises an identification interface for marking the type of the base station and the position of the BBU.

5. The system according to claim 3, wherein the interface unit further comprises a Dry Contact input interface for expanding the input Dry Contact functions of the base station.

6. The system according to claim 3, wherein the first BBU and the second BBU comprise: a master BBU that works in an active state and a standby BBU that works in a standby state.

7. The system according to claim 3, wherein the RFU is connected with any one of the first BBU and the second BBU.

8. The system according to claim 1, wherein the first BBU and second BBU comprise a slave BBU that works in a slave state.

9. The system according to claim 1, wherein the main processing unit, the clock unit, the base band signal processing unit, the transmission unit and the interface unit are integrated in a BBU cassette.

10. A base band unit (BBU), comprising:
a main processing unit;
a clock unit;
a base band signal processing unit;
a transmission unit; and
an interface unit;

wherein the interface unit is configured to
  intercommunicate digital base band signals with the base band signal processing unit; and
  intercommunicate master control information with the main processing unit;
wherein the interface unit comprises a primary base band RF interface, configured to connect with a Radio Frequency unit (RFU);
wherein the interface unit of the BBU further comprises a capacity expansion interface, configured to communicate with another BBU via an exchange base band (BB) cassette; and
wherein the BB cassette comprises a plurality of capacity expansion interfaces; the BBU is connected with a capacity expansion interface of the exchange BB cassette via the capacity expansion interface of the BBU; and the other BBU is connected with another capacity expansion interface of the exchange BB cassette.

11. The base band unit according to claim 10, wherein the primary base band RF interface is a high speed digital interface.

12. The base band unit according to claim 10, wherein the interface unit further comprises an identification interface for marking the type of a base station in which the BBU belongs and the position of the BBU.

13. The base band unit according to claim 10, wherein the interface unit is further configured to transmit the master control information or the base band signals from the BBU to the other BBU.

14. The base band unit according to claim 13, wherein the interface unit further comprises at least one of:

a reset interface for resetting a base station in which the BBU belongs;
an identification interface for marking the type of the base station and the position of the BBU;
a power supply switches for controlling power on and power off for the base station;
a test interface for connecting the BBU with an external test equipment;
a signal input interface for receiving external clock signals;
a Dry Contact input interface for expanding input Dry Contact functions of the base station;
an electrostatic discharge (ESD) connector; and
a protect ground (PGND) terminal.

15. The base band unit according to claim 14, wherein the signal input interface comprises a signal input interface for receiving GPS synchronous clock signals and/or a signal input interface for receiving 2M synchronous clock signals.

16. The base band unit according to claim 14, wherein the test interface comprises at least one of a 10M test interface for outputting 10M test synchronous clock signals and a transmission time interval (TTI) test interface for outputting TTI signals.

17. The base band unit according to claim 13, wherein the capacity expansion interface comprises one or a plurality of capacity expansion interfaces interface(s) for providing an active/standby switchover control signal.

18. The base band unit according claim 10, wherein the main processing unit, the clock unit, the base band signal processing unit, the transmission unit and the interface unit are integrated in a BBU cassette.

* * * * *